(12) United States Patent
Matsunaga

(10) Patent No.: US 9,516,548 B2
(45) Date of Patent: Dec. 6, 2016

(54) COMMUNICATION SYSTEM, BASE STATION, AND COMMUNICATION METHOD

(71) Applicant: NEC Corporation, Tokyo (JP)

(72) Inventor: Yasuhiko Matsunaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/425,184

(22) PCT Filed: Aug. 29, 2013

(86) PCT No.: PCT/JP2013/005106
§ 371 (c)(1),
(2) Date: Mar. 2, 2015

(87) PCT Pub. No.: WO2014/034118
PCT Pub. Date: Mar. 6, 2014

(65) Prior Publication Data
US 2015/0223113 A1    Aug. 6, 2015

(30) Foreign Application Priority Data

Aug. 29, 2012 (JP) ................................. 2012-188520

(51) Int. Cl.
*H04W 28/08*    (2009.01)
*H04W 36/00*    (2009.01)
(Continued)

(52) U.S. Cl.
CPC ......... *H04W 28/08* (2013.01); *H04W 36/0011* (2013.01); *H04W 36/22* (2013.01);
(Continued)

(58) Field of Classification Search
CPC ... H04W 28/08; H04W 36/0011; H04W 36/22
(Continued)

(56) References Cited

U.S. PATENT DOCUMENTS 8,605,586 B2 * 12/2013 Park ................. H04W 36/22
370/230
9,002,363 B2    4/2015 Ashraf et al.
(Continued)

FOREIGN PATENT DOCUMENTS

EP    1389888    2/2004
EP    2296394    3/2011
(Continued)

OTHER PUBLICATIONS

International Search Report, PCT/JP2013/005106, Oct. 1, 2013.
(Continued)

*Primary Examiner* — Ronald B Abelson
(74) *Attorney, Agent, or Firm* — Young & Thompson

(57) ABSTRACT

Disclosed is a communication system in which information about the number of active users in each cell can be shared between base stations. A communication system according to the present exemplary embodiment includes a first base station controlling a first cell and a second base station connected to the first base station through an inter-base-station interface, wherein the first base station transmits operation information on the first cell to the second base station through the inter-base-station interface, wherein the operation information on the first cell includes information about a load on the first cell and information about the number of active users in the first cell.

20 Claims, 19 Drawing Sheets

(51) Int. Cl.
*H04W 36/22* (2009.01)
*H04W 92/20* (2009.01)
*H04W 48/06* (2009.01)
*H04W 84/18* (2009.01)

(52) U.S. Cl.
CPC ........... *H04W 48/06* (2013.01); *H04W 92/20* (2013.01); *H04W 84/18* (2013.01)

(58) Field of Classification Search
USPC ........................................................ 370/236
See application file for complete search history.

(56) References Cited

U.S. PATENT DOCUMENTS

| | | | |
|---|---|---|---|
| 9,204,313 | B2 | 12/2015 | Dahlen et al. |
| 9,258,743 | B2 * | 2/2016 | Ji ........................... H04W 28/16 |
| 2004/0219912 | A1 | 11/2004 | Johansson et al. |
| 2005/0090263 | A1 | 4/2005 | Ebata |
| 2010/0214943 | A1 | 8/2010 | Immendorf et al. |
| 2011/0211560 | A1 | 9/2011 | Yamamoto et al. |
| 2013/0072201 | A1 | 3/2013 | Nakamura et al. |
| 2013/0079015 | A1 | 3/2013 | Kitaji |
| 2014/0295846 | A1 | 10/2014 | Ashraf et al. |
| 2015/0222482 | A1 | 8/2015 | Matsunaga |

FOREIGN PATENT DOCUMENTS

| | | | | |
|---|---|---|---|---|
| JP | 2005-117357 | | 4/2005 | |
| JP | 2011-182009 | | 9/2011 | |
| JP | 2011-250213 | | 12/2011 | |
| JP | 2011-259202 | | 12/2011 | |
| JP | 2012-004837 | | 1/2012 | |
| JP | WO2012029143 | * | 3/2012 | ............ H04W 36/22 |
| JP | 2012-509007 | | 4/2012 | |
| WO | WO 2014/034115 | | 3/2014 | |

OTHER PUBLICATIONS

3rd Generation Partnership Project; Technical Specification Group Radio Access Network; Evolved Universal Terrestrial Radio Access Network (E-UTRAN); Self-configuring and self-optimizing network (SON) use cases and solutions (Release 9), 3GPP TR 36.902 V9.3.1 (Mar. 2011), Mar. 2011.
3GPP TS 36.331. "Self-Organizing Networks (SON); Concepts and requirements (release 11)" v.11.13.0 (Dec. 2011).
3GPP TS 36.423, Evolved universal Terrestrial Radio Access Network (E-UTRAN); X2 application protocol (X2AP) (Release 11) v.11.00 (Mar. 2012).
Japanese Office Action dated Mar. 23, 2016 in corresponding Japanese Patent Application No. 2014-532799 with partial English language translation of Japanese Office Action.
Supplementary European Search Report dated Mar. 29, 2016 in corresponding European Patent Application No. 13833676.3.

* cited by examiner

FIG. 1

|  | BEFORE LOAD BALANCING CONTROL | | AFTER LOAD BALANCING CONTROL | |
|---|---|---|---|---|
|  | CELL11 | CELL21 | CELL11 | CELL21 |
| LOAD | 50% | 100% | 60% | 90% |
| NUMBER OF ACTIVE USERS | 10 | 2 | 11 | 1 |
| MEAN USER THROUGHPUT | 10 Mb/s | 50 Mb/s | 8 Mb/s | 90 Mb/s |

(Related Art)

FIG. 8

| OPERATION INFORMATION ON CELL 23 | Counters | | | | |
|---|---|---|---|---|---|
| | DL Total PRB Usage [%] 200 | 50 | 10 | 10 | 10 | ... |
| | UL Total PRB Usage [%] 201 | | | | |
| | DL Active Number of Users 202 | | | | |
| | UL Active Number of Users 203 | | | | |
| | ... | | | | |

FIG. 9

| OPERATION INFORMATION ON CELL 24 | Counters | DL Total PRB Usage [%] 210 | UL Total PRB Usage [%] 211 | DL Active Number of Users 212 | UL Active Number of Users 213 | ... |
|---|---|---|---|---|---|---|
| | | 100 | 10 | 2 | 2 | ... |

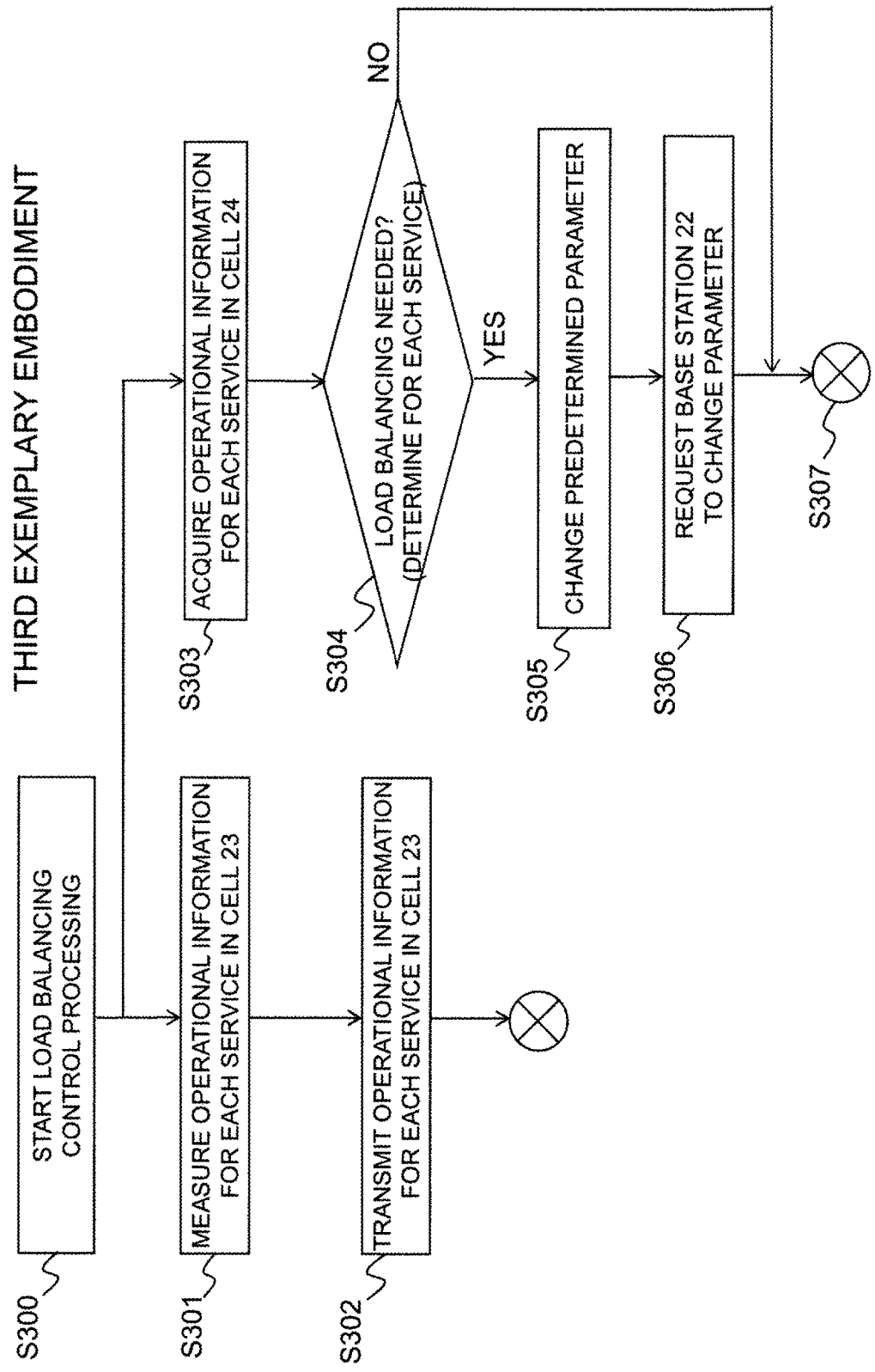

FIG. 12

FOURTH EXEMPLARY EMBODIMENT

| OPERATION INFORMATION ON CELL 23 | | |
|---|---|---|
| Counters | Sub-Counters | |
| DL Total PRB Usage [%] 200 | | 50 |
| UL Total PRB Usage [%] 201 | | 10 |
| DL Active Number of Users 202 | | 10 |
| UL Active Number of Users 203 | | 10 |
| DL Total PRB Usage per Operator [%] 205 | Operator A DL Total PRB Usage | 20 |
| | Operator B DL Total PRB Usage | 20 |
| UL Total PRB Usage per Operator [%] 206 | Operator A UL Total PRB Usage | 4 |
| | Operator B UL Total PRB Usage | 3 |
| DL Active Number of Users per Operator 207 | Operator A DL Active Number of Users | 8 |
| | Operator B DL Active Number of Users | 2 |
| UL Active Number of Users per Operator 208 | Operator A UL Active Number of Users | 8 |
| | Operator B UL Active Number of Users | 2 |
| ... | ... | ... |

FIG. 15

| OPERATION INFORMATION ON CELL 23 | | |
|---|---|---|
| Counters | Sub-Counters | |
| DL Total PRB Usage [%] 200 | | 50 |
| UL Total PRB Usage [%] 201 | | 10 |
| DL Active Number of Users 202 | | 10 |
| UL Active Number of Users 203 | | 10 |
| Number of Calls per DL User Throughput 204 | DL User Throughput < 0.1Mb/s | 0 |
| | 0.1 Mb/s < DL User Throughput < 0.2 Mb/s | 1 |
| | 0.2 Mb/s < DL User Throughput < 0.5 Mb/s | 2 |
| | 0.5 Mb/s < DL User Throughput < 1.0 Mb/s | 3 |
| | 1.0 Mb/s < DL User Throughput < 2.0 Mb/s | 4 |
| | 2.0 Mb/s < DL User Throughput < 5.0 Mb/s | 5 |
| | 5.0 Mb/s < DL User Throughput < 10 Mb/s | 4 |
| | 10 Mb/s < DL User Throughput < 20 Mb/s | 3 |
| | 20 Mb/s < DL User Throughput < 50 Mb/s | 2 |
| | DL User Throughput >= 50 Mb/s | 1 |
| ... | | ... |

FIG. 17 SIXTH EXEMPLARY EMBODIMENT

FIG. 18

| OPERATION INFORMATION ON CELL 23 | |
|---|---|
| Counters | |
| DL Total PRB Usage [%] <u>200</u> | 50 |
| UL Total PRB Usage [%] <u>201</u> | 10 |
| DL Active Number of Users <u>202</u> | 10 |
| UL Active Number of Users <u>203</u> | 10 |
| DL Maximum Transmission Power [dBm] <u>209</u> | 40 |
| DL Reference Signal Transmission Power [dBm] <u>210</u> | 30 |
| ... | ... |

COMMUNICATION SYSTEM, BASE STATION, AND COMMUNICATION METHOD

TECHNICAL FIELD

The present invention relates to the transmission and reception of information between base stations.

BACKGROUND ART

In a cellular-based mobile communication system, a large number of base stations are deployed in a wide area, and each base station covers one to about ten small zones known as cells. Here, standardization groups such as 3GPP (3rd Generation Partnership Program) go ahead with the standardization of a system called Self Organizing Network (SON), which autonomously changes parameters of base stations and the like based on the values of radio quality measured by base stations and terminals in a mobile communication system.

For example, NPL 1 describes a SON-related standardization. In the standardization described in NPL 1, the followings are cited as SON use cases: Coverage and Capacity Optimization, Energy Savings, Interference Reduction, Automated Configuration of Physical Cell Identity, Mobility Robustness Optimization, Mobility Load Balancing, RACH Optimization, Automatic Neighbor Relation Function, and the like.

Moreover, NPL 2 describes that methods for the deployment of functions for implementing SON in a wireless system complying with the LTE (Long Term Evolution) standardization are classified as follows.

(1) NM-Centralized SON: the SON algorithm is executed at network management level.

(2) EM-Centralized SON: the SON algorithm is executed at element management level.

(3) Distributed SON: the SON algorithm is executed at network element level.

Moreover, the deployment of the functions in which the SON algorithm is divided and executed at two or more of (1), (2) and (3) above, is known as Hybrid SON.

In the deployment of the functions according to (1) above, the SON algorithm is executed in a centralized manner by a network management system (NMS), which integrates multiple element management systems (EMSs) and secondarily manages base stations.

In the deployment of the functions according to (2) above, the SON algorithm is executed in a centralized manner by an EMS that primarily manages base stations.

In the deployment of the functions according to (3) above, information required for SON is directly exchanged between network elements (here, assumed to be base stations). The SON algorithm is executed by base stations in a distributed manner.

Incidentally, an EMS is provided for each vender of base stations in general. Accordingly, there are some cases where operation information on base stations cannot be transmitted and received between EMSs. In this case, inter-base-station (inter-BS) interfaces need to be used in order for an EMS in a system with the deployment of the functions according to (2) above to acquire operation information on a neighbor base station out of its own management.

Similarly, there are some cases where operation information on base stations cannot be transmitted and received between NMSs. In this case, inter-BS (or inter-EMS) interfaces need to be used in order for an NMS in a system with the deployment of the functions according to (1) above to acquire operation information on a base station out of its own management.

As described above, in any of (1) to (3) above, operation information on a base station needs to be transmitted and received through an inter-BS interface, in order to collect operation information on a neighbor base station, Note that an inter-BS interface in LTE is defined as the X2 interface in NPL 3. Examples of operation information on a base station transmitted and received over the X2 interface include load information on each cell (RESOURCE STATUS UPDATE) and configuration information on a neighbor cell list and random access channels (ENB CONFIGURATION UPDATE). Moreover, NPL 2 cites the following four items as loads on each cell (RESOURCE STATUS UPDATE) transmitted and received between base stations: namely, Hardware Load Indicator, S1 TNL Load Indicator, Radio Resource Status, and Composite Available Capacity Group.

PTLs 1 and 2 also describe operation information on a base station transmitted and received through an inter-BS interface.

In a wireless communication system according to PTL 1, load information on a base station is transmitted and received between base stations. In a wireless communication system according to PTL 2, the degree of sufficiency of throughputs required of mobile terminals connected to a base station is transmitted and received between base stations.

CITATION LIST

Patent Literature

[PTL 1]
Japanese Patent Application Unexamined Publication No. 2011-250213
[PTL 2]
Japanese Patent Application Unexamined Publication No. 2011-259202

Non-Patent Literature

[NPL 1]
3GPP TR 36.902, "Evolved Universal Terrestrial Radio Access Network (E-UTRAN); Self-configuring and self-optimizing network (SON) use cases and solutions (Release 9)", v.9.3.1 (2011.03)
[NPL 2]
3GPP TS 36.331, "Self-Organizing Networks (SON); Concepts and requirements (Release 11)", v.11.1.0 (2011.12)
[NPL 3]
3GPP TS 36.423, "Evolved Universal Terrestrial Radio Access Network (E-UTRAN); X2 application protocol (X2AP) (Release 11)", v.11.0.0 (2012.03)

SUMMARY OF INVENTION

Technical Problem

As described above, in the communication systems described in NPLs 2 and 3 and PTL 1, information indicating the load on a base station is transmitted and received through an inter-BS interface.

In general, when load balancing between these neighboring cells is performed based on load information transmitted and received through an inter-BS interface, the loads on neighboring cells are compared. In the case where the loads are prominently uneven, a user terminal belonging to a more heavily loaded cell is controlled so as to belong to a more lightly loaded cell.

Generally, a user terminal in packet communication tends to maximize the instantaneous communication rate by using as many resources as available. Accordingly, even if loads are leveled between neighboring cells, there are some cases where the communication rate of each user terminal is not improved. A case will be described as a specific example where load balancing is performed between a cell CELL11 of a base station 10 and a cell CELL21 of a base station 20, using FIG. 1.

FIG. 1 shows a table of the loads on individual cells, the numbers of active users, and the mean user throughputs in the individual cells, before and after load balancing. Note that the number of active users is the number of communication terminals (user terminal) connected to a base station in a cell. As shown in the table of FIG. 1, it is assumed that before load balancing, the load on the CELL11 of the base station 10 is 50%, the number of active users in the CELL11 is 10, and the mean user throughput of user terminal is 10 Mb/s. Moreover, it is assumed that before load balancing, the load on the CELL21 of the base station 20 is 100%, the number of active users in the CELL21 is 2, and the mean user throughput of user terminal is 50 Mb/s.

In this case, the load on the CELL21 is heavier than the load on the CELL11 before load balancing. Accordingly, if load balancing is performed only considering the load on each cell, control is performed so as to have a user terminal belonging to the CELL21 belong to the CELL11.

As a result, after load balancing, the load on, the number of active users in, and the mean throughput of user terminal in the CELL11 become 60%, 11, and 8 Mb/s, respectively. Moreover, the load on, the number of active users in, and the mean user throughput of user terminal in the CELL21 become 90%, 9, and 90 Mb/s, respectively.

The loads on the CELL11 and CELL21 are leveled through this control. On the other hand, the mean user throughput of user terminal in the CELL11, which was low before load balancing, has become further lower after load balancing. Moreover, the mean user throughput of user terminal in the CELL21, which kept a sufficient value before load balancing, has become further higher after load balancing. This result shows that there is correlation between the number of active users relative to the load on a cell and the user throughput. Accordingly, when load balancing is performed only considering the loads on cells, a case may occur where this load balancing makes the difference between the mean user throughputs of user terminals larger, which means that effective load balancing control cannot be performed.

Moreover, in the communication system according to PTL 2, each user terminal needs to calculate the degree of sufficiency of a required throughput and report it to a base station. Accordingly, the load on the user terminal is increased, and so effective load balancing control cannot be performed.

Such problems are caused by the fact that in the communication systems according to NPLs 2 and 3 and PTLs 1 and 2, information on the number of active users in each cell is not shared between base stations.

In view of the above-described problems, an object of the present invention is to provide a communication system in which information on the number of active users in each cell can be shared between base stations.

Solution to Problem

A communication system according to the present exemplary embodiment comprises: a first base station controlling a first cell; and a second base station connected to the first base station through an inter-BS interface, wherein the first base station transmits operation information on the first cell to the second base station through the inter-BS interface, wherein the operation information on the first cell includes a load on the first cell and a number of active users in the first cell.

A base station according to the present exemplary embodiment is a base station controlling a first cell and comprises a communication section that transmits operation information on the first cell to anther base station through an inter-BS interface, wherein the operation information on the first cell includes information about a load on the first cell and information about a number of active users in the first cell.

A communication method according to the present exemplary embodiment comprises the step of transmitting operation information on a first cell controlled by a first base station to a second base station through an inter-BS interface, wherein the operation information on the first cell includes a load on the first cell and a number of active users in the first cell.

A program according to the present exemplary embodiment causes a computer to execute the step of transmitting operation information on a first cell controlled by a first base station to a second base station through an inter-BS interface, wherein the operation information on the first cell includes a load on the first cell and a number of active users in the first cell.

A recording medium according to the present exemplary embodiment is a computer-readable information recording medium and records the program according to the present exemplary embodiment.

Advantageous Effects of Invention

According to the present invention, it is possible to share information on the number of active users in each cell between base stations.

BRIEF DESCRIPTION OF DRAWINGS

FIG. 1 is a diagram schematically showing an example of load balancing control in a general communication system.

FIG. 8 is a diagram showing an example of operation information on a cell 23 in the second exemplary embodiment of the present invention.

FIG. 9 is a diagram showing an example of operation information on a cell 24 in the second exemplary embodiment of the present invention.

FIG. 11 is a flowchart for describing load control processing in a third exemplary embodiment of the present invention.

FIG. 12 is a diagram showing an example of operation information on the cell 23 in a fourth exemplary embodiment of the present invention.

FIG. 15 is a diagram showing an example of operation information on the cell 23 in the fifth exemplary embodiment of the present invention.

FIG. 18 is a diagram showing an example of operation information on the cell 23 in the sixth exemplary embodiment of the present invention.

DESCRIPTION OF EMBODIMENTS

Exemplary embodiments of the present invention will be described with reference to drawings. However, these embodiments are not intended to limit the technical scope of the present invention.

1. First Exemplary Embodiment

A communication system according to a first exemplary embodiment of the present invention will be described using FIG. 2.

Figure 2:
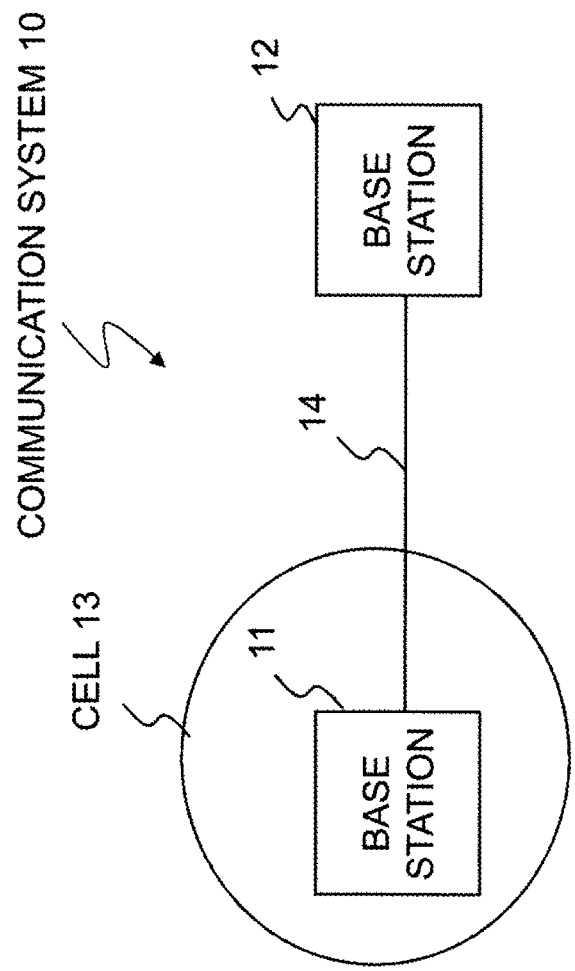
FIG. 2 is a diagram showing a schematic architecture of a communication system according to a first exemplary embodiment of the present invention.

Referring to FIG. 2, a communication system 10 according to the present exemplary embodiment includes base stations 11 and 12. The base station 11 controls a cell 13. The base station 12 is connected to the base station 11 through an inter-BS interface 14. Moreover, the base station 11 transmits operation information on the cell 13 to the base station 12 through the inter-BS interface 14. An inter-BS interface is, for example the X2 interface. The operation information on the cell 13 includes the load on the cell 13 and the number of active users in the cell 13. The number of active users is the number of communication terminals (user terminals) connected to a base station in a cell. Here, the number of active users may refer to the number of communication terminals concurrently connected to a base station, or may refer to the number of communication terminals connected within a predetermined time range. Note that when the base station 11 controls a plurality of cells, the base station 11 transmits operation information on each cell to the base station 12.

Figure 3:
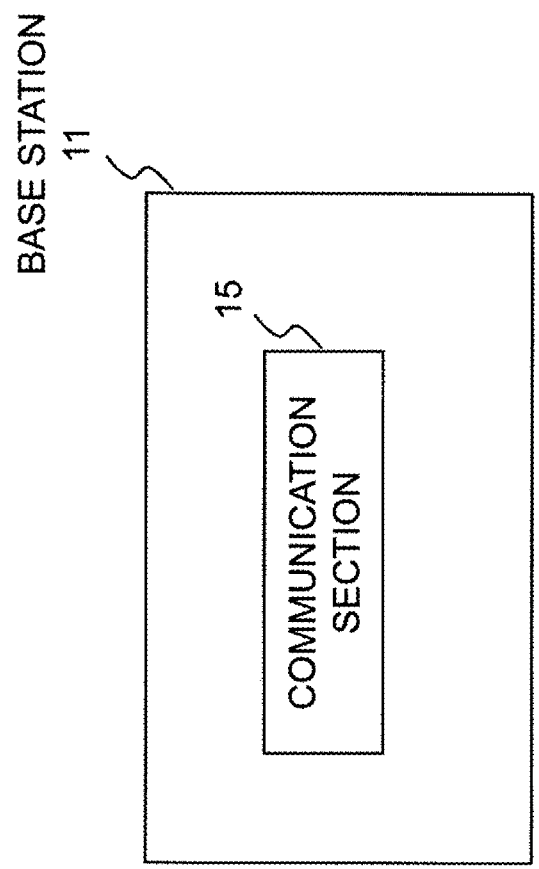
FIG. 3 is a block diagram showing a schematic configuration of a base station according to the first exemplary embodiment of the present invention.

Next, FIG. 3 shows a configuration of the base station 11. The base station 11 includes a communication section 15. The communication section 15 transmits operation information on the cell 13, which is formed by the base station 11, to the base station 12 through the inter-BS interface 14. When the base station 11 forms a plurality of cells, the base station 11 transmits operation information on each cell to the base station 12.

Figure 4:
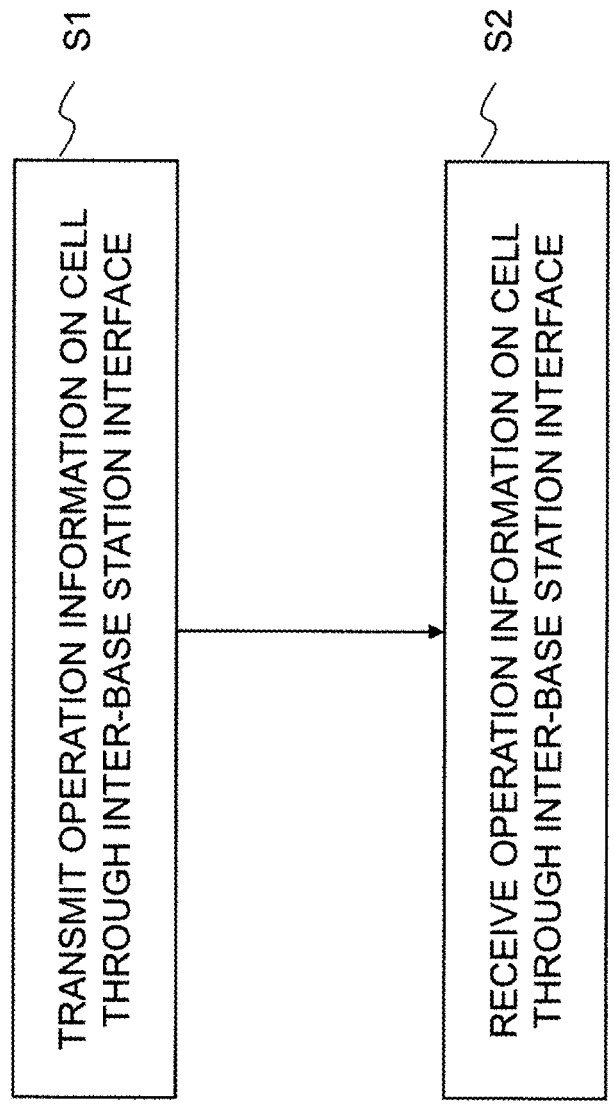
FIG. 4 is a flowchart for describing operations in the communication system according to the first exemplary embodiment of the present invention.

Next, an operation in the communication system 10 according to the present exemplary embodiment will be described using FIG. 4. In the communication system according to the present exemplary embodiment, the base station 11 transmits operation information on the cell 13 through the inter-BS interface 14 (Operation S1). When the base station 11 forms a plurality of cells, the base station 11 transmits operation information on each cell. Then, the base station 12 receives the operation information on the cell 13 through the inter-BS interface 14 (Operation S2).

As described above, according to the present exemplary embodiment, base stations transmit and receive information on the load on a cell and the number of active users in this cell. Thus, base stations can share information on the loads on individual cells and the numbers of active users in the individual cells.

Hence, for example, when the base station 12 performs load balancing control, the base station 12 can consider the number of active users in the cell 13 of the base station 11 in addition to the load on the cell 13. As described above, there is correlation between the number of active users relative to the load on a cell and the user throughput. Accordingly, in the communication system according to the present exemplary embodiment, it is possible to perform efficient load balancing control, considering not only the leveling of cell loads but also the leveling of user throughputs.

Further, according to the present exemplary embodiment, since operation information on cells is transmitted and received through inter-BS interfaces, it is possible to prevent performance degradation in load balancing control accompanied by delays in transmission and reception of operation information, in comparison with a case where operation information on cells is transmitted and received via an EMS or NMS.

2. Second Exemplary Embodiment

2.1) System Architecture

Next, a communication system 20 according to a second exemplary embodiment of the present invention will be described using FIGS. 5 and 6.

Figure 5:
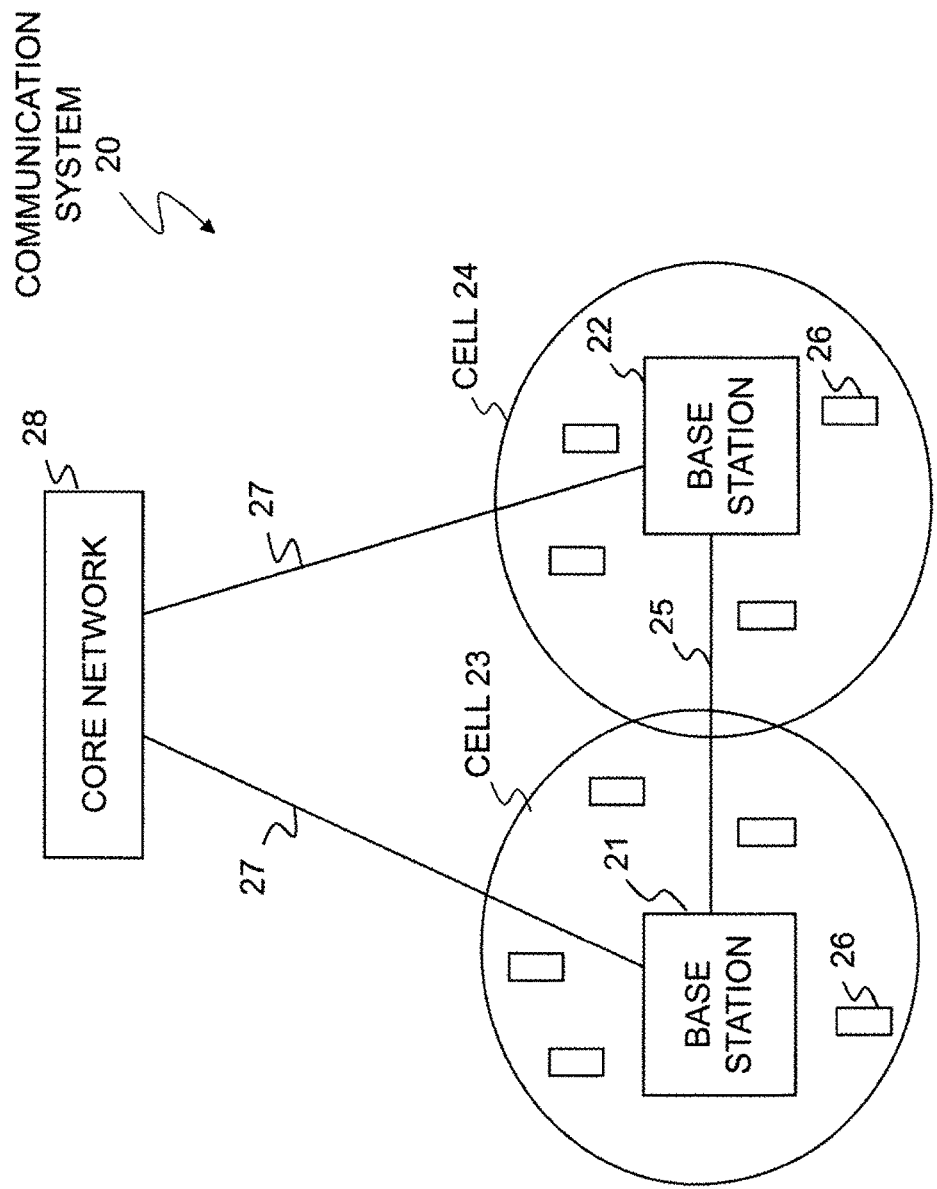
FIG. 5 is a diagram showing a schematic architecture of a communication system according to a second exemplary embodiment of the present invention.

Referring to FIG. 5, the communication system 20 according to the present exemplary embodiment includes base stations 21 and 22. The base stations 21 and 22 are connected through an inter-BS interface 25. Moreover, the base stations 21 and 22 communicate with multiple user terminals 26 within cells 23 and 24, respectively. Furthermore, the base stations 21 and 22 each communicate with a core network 28 through a base station-core interface 27. The base stations 21 and 22 each perform processing for relaying communication between the core network 28 and the user terminal 26.

Figure 6:
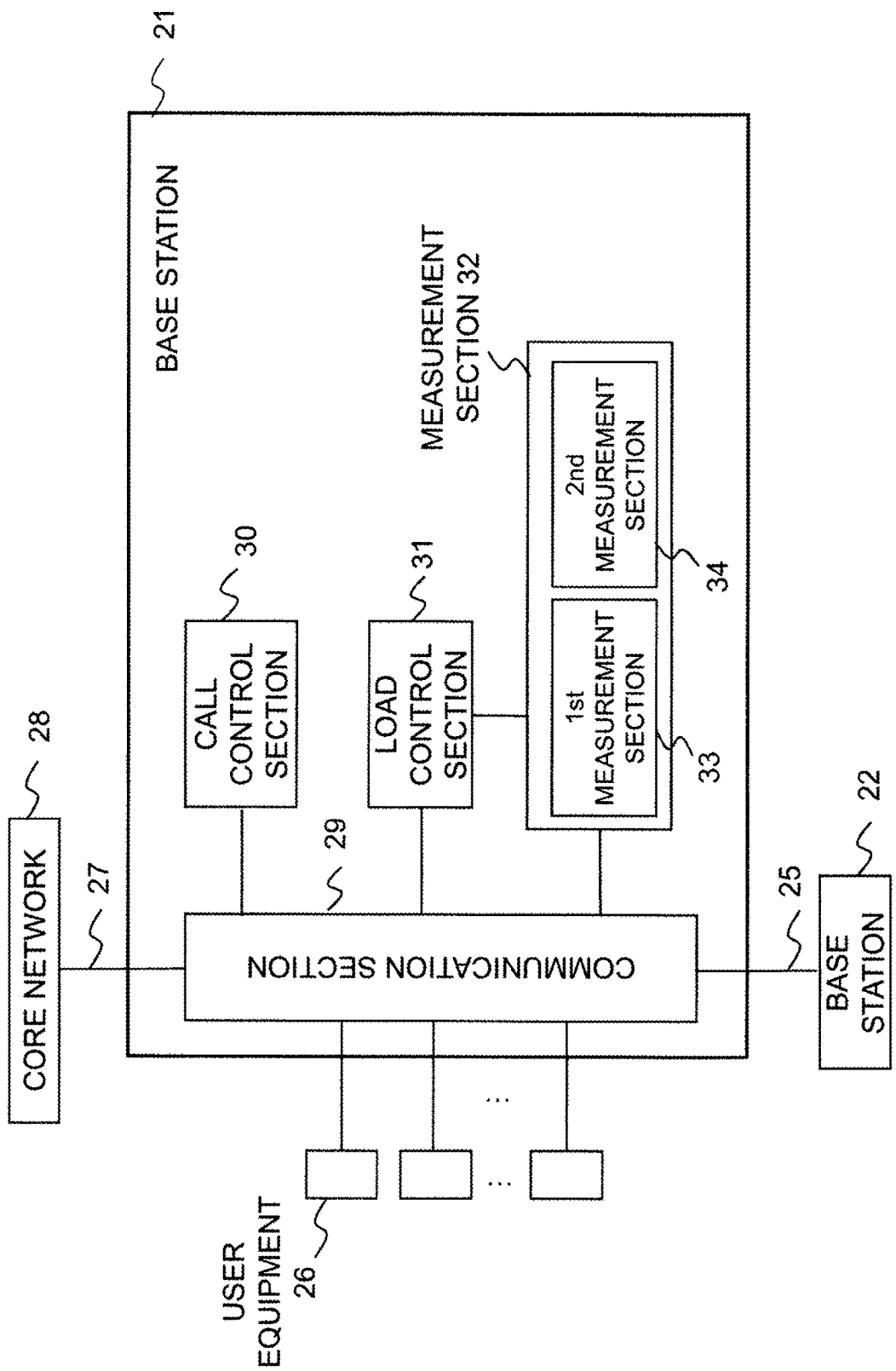
FIG. 6 is a block diagram showing a configuration of a base station according to the second exemplary embodiment of the present invention.

FIG. 6 shows a functional configuration of the base station 21. Note that the base station 22 also has a similar configuration to the base station 21. The base station 21 includes a communication section 29, a call control section 30, a load control section 31, and a measurement section 32. The measurement section 32 includes a first measurement section 33 and a second measurement section 34. The communication section 29 communicates with the base station 22 through the inter-BS interface 25 and performs transmission/reception of signals for processing of handover between the cells 23 and 24, transmission/reception of information on the load and the number of active users measured by the measurement section 32, which will be described later, and transmission/reception of control signals for load balancing control. Moreover, the communication section 29 transmits/receives user data to/from the multiple user terminals 26 over radio links. Further, the communication section 29 connects to the core network 28 through the base station-core interface 27 and performs processing for relaying traffic of the user terminal 26.

The call control section 30 makes calls to and receives calls from the user terminal 26 as well as performs handover control, radio resource assignment and the like.

The load control section 31 performs control for load balancing between the cell 23 controlled by the base station 21 and the cell 24 controlled by the base station 22 neighboring on the base station 21, based on operation information on the cells. Note that operation information on the cell 24 in the present exemplary embodiment indicates the load on the cell 24 and the mean value of the number of active users in the cell 24.

The first measurement section 33 of the measurement section 32 measures the loads per unit time on the downlink and uplink in the cell 23 controlled by the base station 21. Moreover, the second measurement section 34 of the measurement section 32 measures the mean values of the numbers of active users per unit time on the downlink and uplink in the cell 23.

2.2) System Operation

Figure 7:
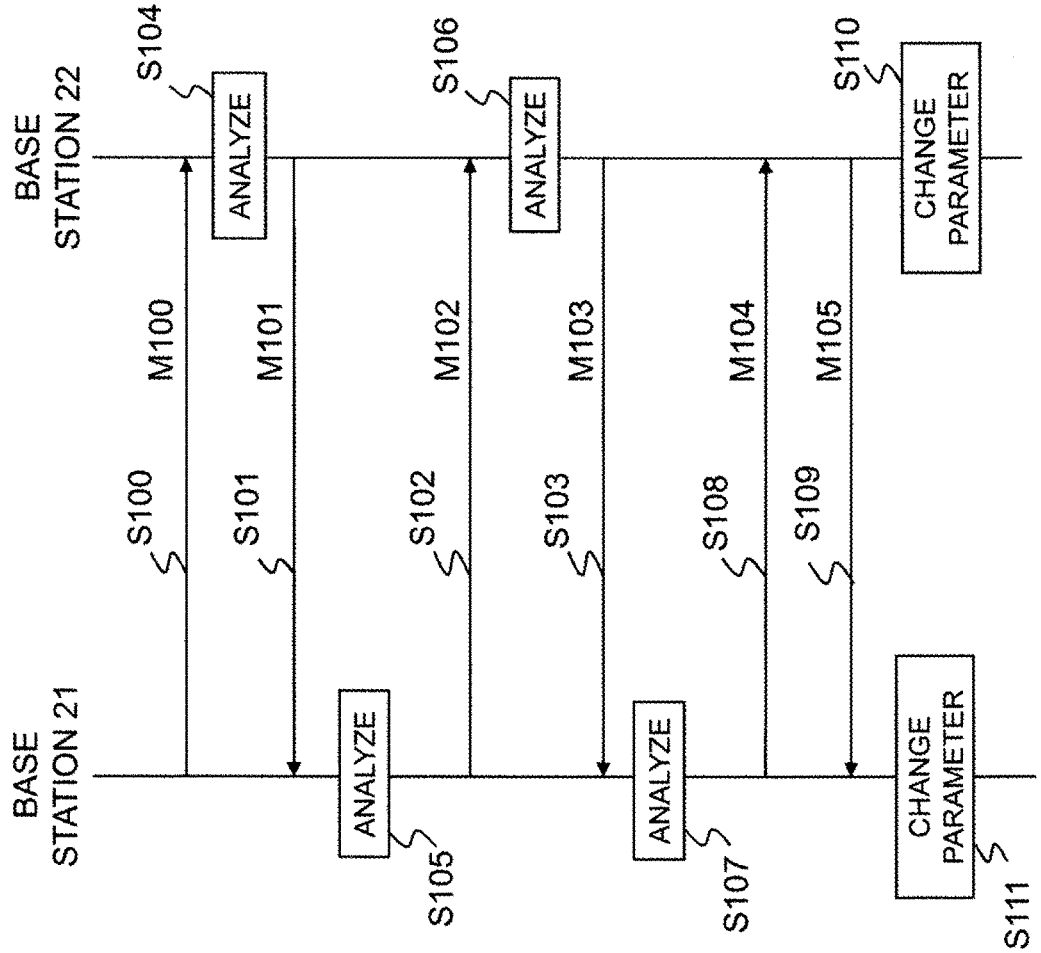
FIG. 7 is a sequence diagram for describing operations in the communication system according to the second exemplary embodiment of the present invention.

Next, operations in the communication system 20 according to the present exemplary embodiment will be described using FIG. 7. FIG. 7 shows a sequence of operations in the communication system 20.

The base station 21 sends a message M100 including operation information on the cell 23 controlled by the base station 21 to the base station 22 (Operation S100). Similarly, the base station 22 also sends a message M101 including operation information on the cell 24 controlled by the base station 22 to the base station 21 (Operation S101). The base stations 21 and 22 may be configured to send and receive respective messages M102 and M103 including operation information on the cells 23 and 24, respectively, to/from each other at predetermined periods T0 thereafter (Operations S102 and 103). Alternatively, the base stations may be configured to notify the start or stop of transmission of operation information to each other at any timing. For example, in FIG. 7, the base station 22 may start sending the message M101 to the base station 21 after receiving the message M100 and before analyzing the message M100 (Operation S104), which will be described later. Moreover, the base stations 21 and 22 may stop transmission and reception of operation information for a certain period of time after each having changed a parameter (Operations S110 and 111).

The load control section of the base station 22, after acquiring the operation information on the cell 23, analyzes the operation information on the cells 23 and 24 and determines whether or not there is necessity for load balancing control (Operations S104 and S106). Similarly, the load control section 31 of the base station 21 having acquired the operation information on the cell 24 analyzes the operation information on the cells 23 and 24 and determines the necessity for load balancing between the cells 23 and 24 (Operations S105 and S107). Note that a specific method for determining the necessity for load balancing will be described later.

In the present exemplary embodiment, it is assumed that the base stations 21 and 22 determine in Operations S104 to S106 that there is no necessity for load balancing. Moreover, it is assumed that the base station 21 determines in Operation S107 that there is necessity for load balancing.

In this case, the load control section 31 of the base station 21 sends a parameter change request message M104 to the base station 22 via the communication section 29 (Operation S108). The parameter change request message includes a request to change a load balancing-related parameter such as, for example, an offset value to handover or cell reselection from the cell 23 to the cell 24.

The base station 22, when accepting the request for change included in the parameter change request message, sends a parameter change response message M105 to the base station 21 (Operation S109). Moreover, after or before Operation S109, the base station 22 changes the value of the predetermined parameter in accordance with information included in the parameter change request message (Operation S110). Furthermore, the base station 21 itself changes a predetermined parameter as necessary based on a result of the analysis in Operation S107 (Operation S111). Thus, it is possible to accomplish the leveling of the loads on the cells 23 and 24.

In the manner described above, the base stations 21 and 22 perform control for load balancing between the cells 23 and 24.

Next, FIGS. 8 and 9 show an example of the operation information on the cells to be transmitted and received between the base stations in Operations S100 to S103. FIG. 8 shows an example of the operation information on the cell 23. FIG. 9 shows an example of the operation information on the cell 24.

The operation information on the cells 23 and 24 shown in FIGS. 8 and 9 include the statistics values of measurement information per unit time for each cell managed by a base station. "DL Total PRB Usage (Downlink Total Physical Resource Block Usage) [%]" (200, 210) shows the load on the downlink in a cell and is a value representing the use rate of downlink physical resource blocks in percentages. DL Total PRB Usage is set to zero in a state where any communication including transmission/reception of control information is not being performed, and set to 100 in a state where communication is being performed using all resource blocks. On the other hand, "UL Total PRB Usage (Uplink Total Physical Resource Block Usage) [%]" (201, 211) shows the load on the uplink in a cell and represents the use rate of uplink physical resource blocks. Note that for an index of load, an index other than "PRB usage" will do, and, for example, downlink gross transmission power, uplink broadband received power, total throughput or the like may be used. "DL Active Number of Users" (202, 212) is the number of active users on the downlink. Specifically, it is a value obtained by averaging the numbers of active users on the downlink at sampling times within a statistical time interval. Similarly, "UL Active Number of Users" (203, 213) is the number of active users on the uplink.

2.3) Load Balancing Control

Figure 10:
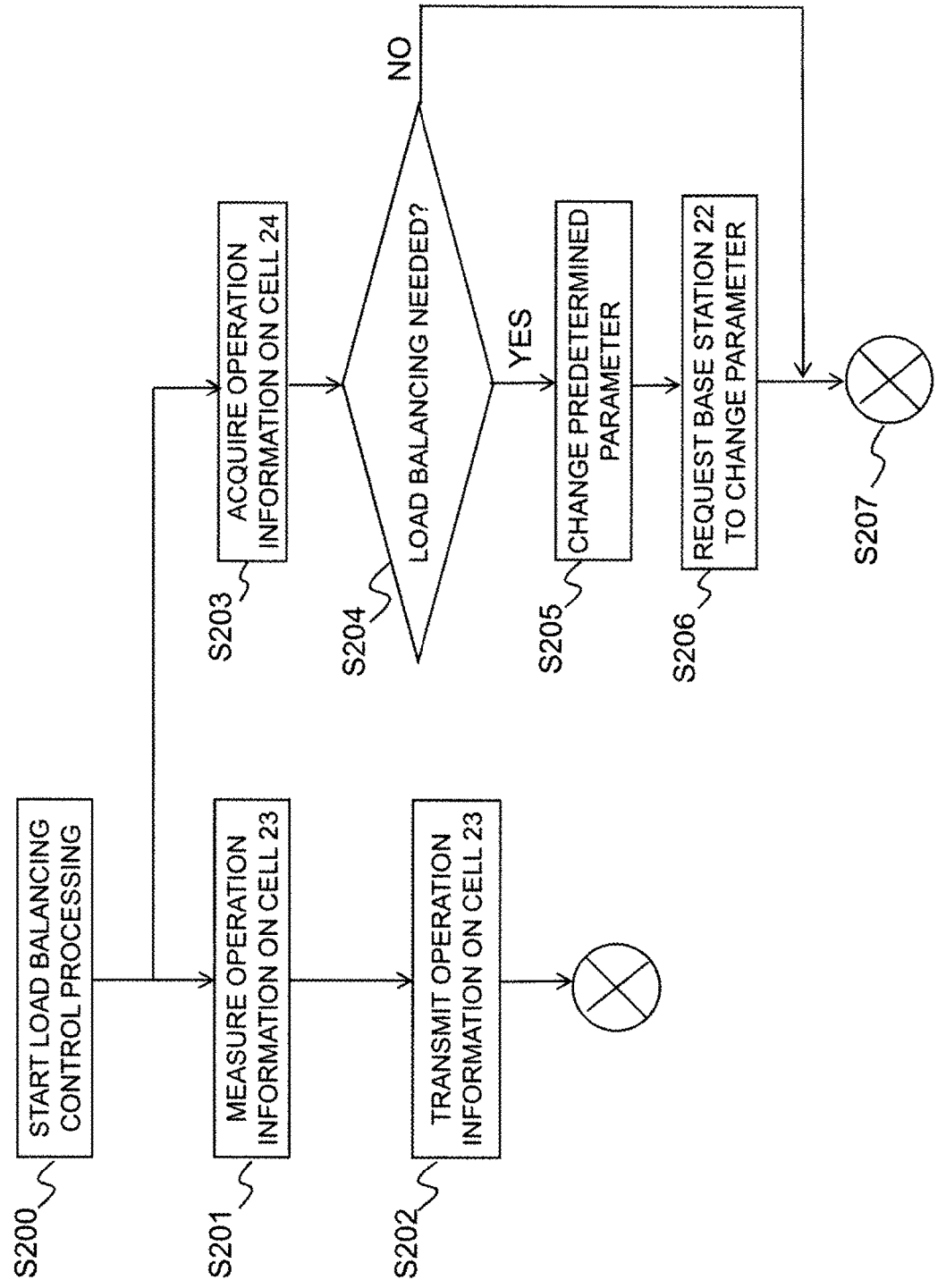
FIG. 10 is a flowchart for describing load control processing in the second exemplary embodiment of the present invention.

Next, a description will be given of a detailed flow of the operations of load balancing control processing according to the present exemplary embodiment in Operations S104 to S111 in FIG. 7, using FIG. 10.

First, a case will be described where the base station 21 transmits operation information on the cell 23 to the base station 22. When the base station 21 starts load balancing control processing (Operation S200), the measurement section 32 measures operation information on the cell 23 controlled by the base station 21 (Operation S201). Here, the measurement section 32 notifies the measured operation information to the load control section 31. Moreover, the measurement section 32 transmits the measured operation information on the cell 23 to the base station 22 via the communication section 29 through the inter-BS interface 25 (Operation S202) and then completes the processing.

Next, a case will be described where the base station 21 receives operation information on the cell 24 from the base station 22. In this case, the load control section 31 acquires the operation information on the cell 24 received from the base station 22 (Operation S203).

Then, the load control section 31, based on the operation information on the cell 23 and the operation information on the cell 24, determines whether or not there is necessity for load balancing between the cells 23 and 24 (Operation S204). That is, based on information about the load on and the number of active users in the cell 23 and the load on and the number of active users in the cell 24, it is determined whether or not there is necessity for load balancing between the cells 23 and 24. For example, it may be determined that load balancing is required when the value of the following expression is larger than a predetermined threshold: (load on the cell 23/number of active users)−(load on the cell 24/number of active users). On the other hand, it may be determined that load balancing is not required when the value of the expression, (load on the cell 23/number of active users)−(load on the cell 24/number of active users), is not larger than the predetermined threshold. Moreover, it is also possible to perform load balancing based on other predetermined expression using loads and the numbers of active users, other than a case as described above where load balancing is performed based on the ratio of a load to the number of active users. For example, it may be determined that load balancing is required when the value of the following expression is larger than a predetermined threshold: ($\alpha$×load on the cell 23+$\beta$×number of active users)−($\alpha$×load on the cell 24+$\beta$×number of active users), where $\alpha$ and $\beta$ are arbitrary fixed coefficients. In this case, it is determined that load balancing is not required when the value of the expression, ($\alpha$×load on the cell 23+$\beta$×number of active users)−($\alpha$×load on the cell 24+$\beta$×number of active users), is not larger than the predetermined threshold.

When it is determined that load balancing is required (YES at Operation S204), the load control section 31 changes a predetermined parameter set on the base station 21 (Operation S205). The predetermined parameter is a parameter related to load balancing, which may be, for example, a parameter related to a criterion of handover and cell reselection from the cell 23 to the cell 24, or may be maximum transmission power and reference signal transmission power in the cell 23. Further, the load control section 31 requests the base station 22 to change a predetermined parameter (Operation S206). The parameter requested to be changed may be, for example, a parameter related to a criterion of handover and cell reselection from the cell 24 to the cell 23, or may be maximum transmission power and reference signal transmission power in the cell 24.

On the other hand, when the load control section 31 determines that load balancing is not required (NO at Operation S204), the processing is completed without changing the parameters (Operation S207).

2.4) Effects

As described above, according to the present exemplary embodiment, in addition to the load on a cell, the number of active users in the cell can be shared between base stations. Accordingly, base stations can perform load balancing control based on not only the loads on individual cells but also the numbers of active users in the individual cells. Hence, in the communication system 20 according to the present exemplary embodiment, it is possible to perform efficient load balancing control, considering not only the leveling of loads between cells but also the leveling of user throughputs.

3. Third Exemplary Embodiment

Next, a communication system according to a third exemplary embodiment of the present invention will be described. Comparing the present exemplary embodiment to the second exemplary embodiment, operation information measured by the measurement section 32 of the base station 21 and a flow of load balancing control processing are different. That is, the first measurement section 33 of the base station 21 in the present exemplary embodiment measures the load on the cell 23 controlled by the base station 21, for each service in the cell 23. Moreover, the second measurement section 34 of the base station 21 measures the number of active users in the cell 23, for each service.

Next, FIG. 11 shows a flowchart of load balancing control processing according to the present exemplary embodiment. First, a case will be described where the base station 21 transmits operation information on the cell 23 to the base station 22. When the base station 21 in the present exemplary embodiment starts load balancing control processing (Operation S300), the measurement section 32 measures operation information for each service in the cell 23 (Operation S301). For example, the measurement section 32 measures operation information for GBR (Guaranteed Bit Rate) service and operation information for non-GBR service in the cell 23 individually and notifies them to the load control section 31. Note that the operation information in the present exemplary embodiment includes at least the loads on and the numbers of active users of individual services in the cell 23. For example, the operation information in the present exemplary embodiment includes the loads on GBR service and non-GBR service and the numbers of active users of these individual services.

Then, the measurement section 32 transmits the operation information for each service in the cell 23 to the base station 22 through the inter-BS interface 25 (Operation S302) and completes the processing.

Next, a case will be described where the base station 21 receives operation information for each service in the cell 24 from the base station 22. In this case, the load control section 31 acquires the operation information for each service in the cell 24 received from the base station 22 (Operation S303).

Subsequently, the load control section 31, based on the operation information for each service in the cells 23 and 24, determines whether or not there is necessity for load balancing between the cells 23 and 24 (Operation S304). For example, determination is made individually as to the necessity for load balancing based on the operation information for GBR service in the cells 23 and 24, and as to the necessity for load balancing based on the operation information for non-GBR service in the cells 23 and 24. Then, when it is determined that load balancing is required for at least any one of the services, it may be determined in Operation S304 that load balancing is required. Alternatively, only when it is determined that load balancing is required for both of the services, it may be determined in Operation S304 that load balancing is required.

Moreover, in a case of using a threshold when determination is performed as to load balancing for each service, the threshold may take different values for different services. For example, the necessity for load balancing based on the operation information for GBR service may be determined based on whether or not the value of the following expression is larger than a first threshold: (load on GBR service in the cell 23/number of active users of GBR service in the cell 23)−(load on GBR service in the cell 24/number of active users of GBR service in the cell 24). The necessity for load balancing based on the operation information for non-GBR service may be determined based on whether or not the value of the following expression is larger than a second threshold: (load on non-GBR service in the cell 23/number of active users of non-GBR service in the cell 23)−(load on non-GBR service in the cell 24/number of active users of non-GBR service in the cell 24).

Then, when it is determined that load balancing is required (YES at Operation S304), the load control section 31 changes a predetermined parameter set on the base station 21 (Operation S305). The predetermined parameter is a load balancing-related parameter, which may be, for example, a parameter related to a criterion of handover and cell reselection from the cell 23 to the cell 24, or may be maximum transmission power and reference signal transmission power in the cell 23. Further, the load control section 31 requests the base station 22 to change a predetermined parameter (Operation S306). The predetermined parameter requested to be changed may be, for example, a parameter related to a criterion of handover and cell reselection from the cell 24 to the cell 23, or may be maximum transmission power and reference signal transmission power in the cell 24.

On the other hand, when the load control section 31 determines that load balancing is not required (NO at Operation S304), the processing is completed without changing the parameters (Operation S307).

As described above, according to the present exemplary embodiment, it is possible to share operation information for each service in a cell between base stations. Accordingly, base stations can perform load balancing control based on information on the loads on and the numbers of active users of individual services in cells. Hence, in the communication system according to the present exemplary embodiment, it is possible to perform more efficient load balancing between cells. Note that although GBR service and non-GBR service are taken as an example of service category in the present exemplary embodiment, other arbitrary service categories may be used, such as, for example, voice service, streaming service, interactive data service, and background data service.

4. Fourth Exemplary Embodiment

Next, a communication system according to a fourth exemplary embodiment of the present invention will be described. Comparing the present exemplary embodiment to the second exemplary embodiment, operation information measured by the measurement section 32 of the base station 21 and a flow of load balancing control processing are different. That is, the first measurement section 33 of the base station 21 in the present exemplary embodiment measures the overall load on the cell 23 controlled by the base station 21 and also measures the load on each provider to which users subscribe. That is, of the load on the cell 23, the first measurement section 33 measures a load arising from communication of users subscribing to a predetermined provider. Moreover, the second measurement section 34 of the base station 21 measures the gross number of active users in the cell 23 and also measures the number of active users of each predetermined provider. That is, of the active users in the cell 23, the second measurement section 34 measures the number of users subscribing to a predetermined provider. Note that it is assumed that telecommunication operators A and B share the base stations 21 and 22 in the present exemplary embodiment.

FIG. 12 shows an example of operation information on the cell 23 transmitted and received between base stations in the present exemplary embodiment. The operation information on the cell 23 shown in FIG. 12 includes the use rate of downlink physical resource blocks for each telecommunication operator (DL Total PRB Usage per Operator) 205, the use rate of uplink physical resource blocks for each telecommunication operator (UL Total PRB Usage per Operator) 206, the number of active users on the downlink for each telecommunication operator (DL Active Number of Users per Operator) 207, and the number of active users on the uplink for each telecommunication operator (UL Active Number of Users per Operator) 208, in addition to the operation information shown in FIG. 8. Note that DL Total PRB Usage and UL Total PRB Usage include common control signals (reference signal, synchronization signal and the like) that do not belong to communication of users subscribing to telecommunication operators. Accordingly, as shown in FIG. 12, a difference arises between the load on the cell 23 and a total of the loads on the individual telecommunication operators.

Figure 13:
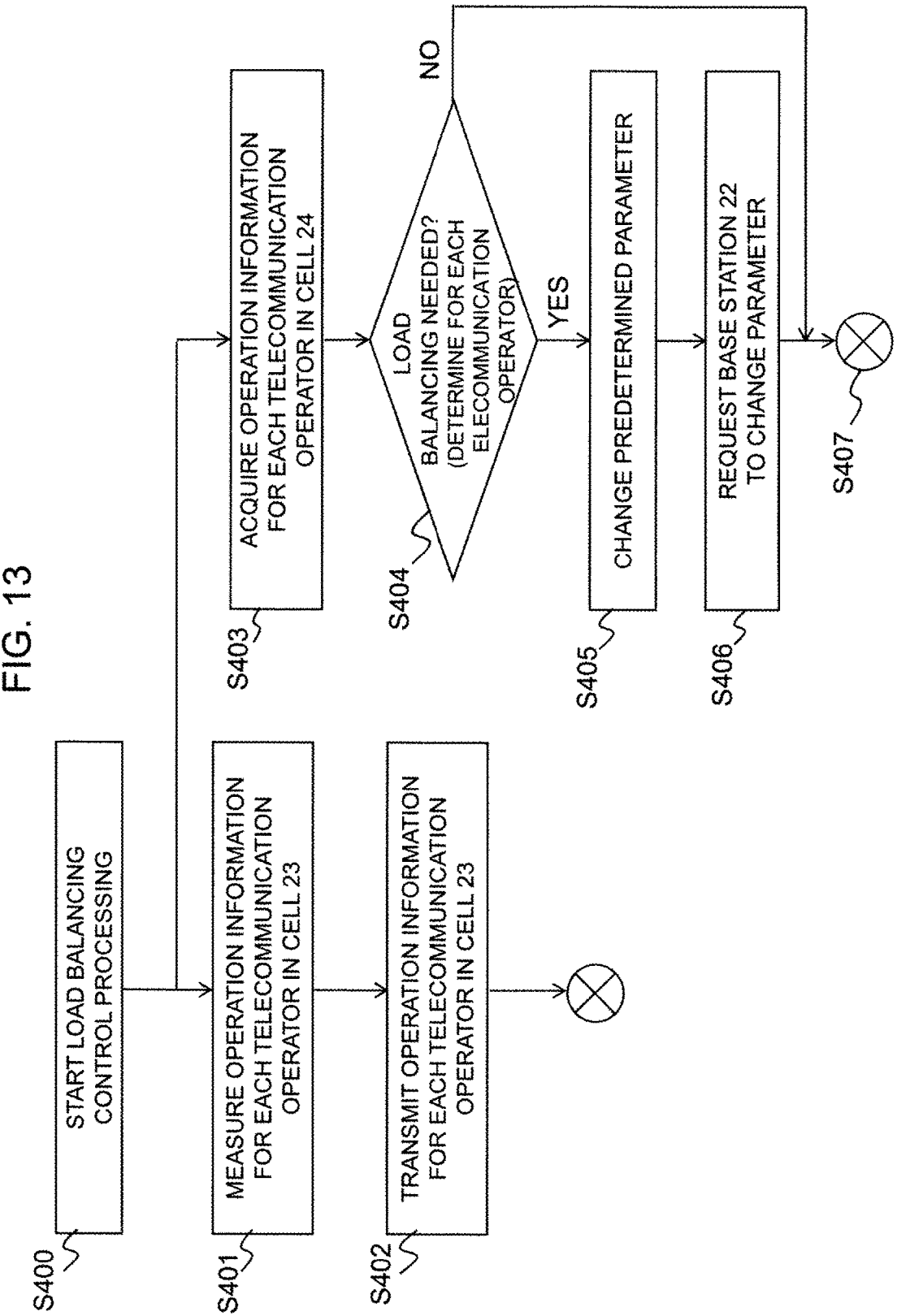
FIG. 13 is a flowchart for describing load control processing in the fourth exemplary embodiment of the present invention.

Next, FIG. 13 shows a flowchart of load balancing control processing according to the present exemplary embodiment. First, a case will be described where the base station 21 transmits operation information on the cell 23 to the base station 22. When the base station 21 in the present exemplary embodiment starts load balancing control processing (Operation S400), the measurement section 32 measures operation information for each telecommunication operator in the cell 23 (Operation S401). That is, the measurement section 32 of the base station 21 in the present exemplary embodiment measures operation information on the cell 23 controlled by the base station 21 for each telecommunication operator and notifies them to the load control section 31. Specifically, of the load on the cell 23, the measurement section 32 measures a load arising from communication of users subscribing to the telecommunication operator A and the number of active users subscribing to the telecommunication operator A. Moreover, of the load on the cell 23, the measurement section 32 measures a load arising from communication of users subscribing to the telecommunication operator B and the number of active users subscribing to the telecommunication operator B.

Then, the measurement section 32 transmits the measured operation information for each telecommunication operator to the base station 22 through the inter-BS interface 25 (Operation S402) and completes the processing.

Next, a case will be described where the base station 21 receives operation information for each telecommunication operator in the cell 24 from the base station 22. In this case, the load control section 31 acquires the operation information for each telecommunication operator in the cell 24 received by the base station 21 (Operation S403).

Subsequently, the load control section 31, based on the operation information for each telecommunication operator in the cells 23 and 24, determines whether or not there is necessity for load balancing between the cells 23 and 24 (Operation S404). For example, the load control section 31 may determine that there is necessity for load balancing when the value of the following expression is larger than a third threshold: (load on the telecommunication operator A in the cell 23/number of active users of the telecommunication operator A in the cell 23)−(load on the telecommunication operator A in the cell 24/number of active users of the telecommunication operator A in the cell 24), or when the value of the following expression is larger than a fourth threshold: (load on the telecommunication operator B in the cell 23/number of active users of the telecommunication operator B in the cell 23)−(load on the telecommunication operator B in the cell 24/number of active users of the telecommunication operator B in the cell 24).

Then, when it is determined that load balancing is required (YES at Operation S404), the load control section 31 changes a predetermined parameter set on the base station 21 for load balancing (Operation S405). The predetermined parameter is a load balancing-related parameter, which may be, for example, a parameter related to a criterion of handover and cell reselection from the cell 23 to the call 24, or may be maximum transmission power and reference signal transmission power in the cell 23. Further, the load control section 31 requests the base station 22 to change a predetermined parameter (Operation S406). The parameter requested to be changed may be, for example, a parameter related to a criterion of handover and cell reselection from the cell 24 to the cell 23, or may be maximum transmission power and reference signal transmission power in the cell 24.

On the other hand, when the load control section 31 determines that load balancing is not required (NO at Operation S404), the processing is completed without changing the parameters (Operation S407).

As described above, according to the present exemplary embodiment, when a plurality of telecommunication operators share communication resources of a single base station, load information and measurement information on the number of active users for each telecommunication operator can be shared between base stations. Accordingly, load balancing control can be performed based on not only the loads on individual cells but also the loads on individual telecommunication operators.

Note that although the present exemplary embodiment shows a case where two telecommunication operators A and B share the base station 21, the present exemplary embodiment may be applied to a case where three or more telecommunication operators share a single base station.

5. Fifth Exemplary Embodiment

Next, a communication system according to a fifth exemplary embodiment of the present invention will be described.

Figure 14:
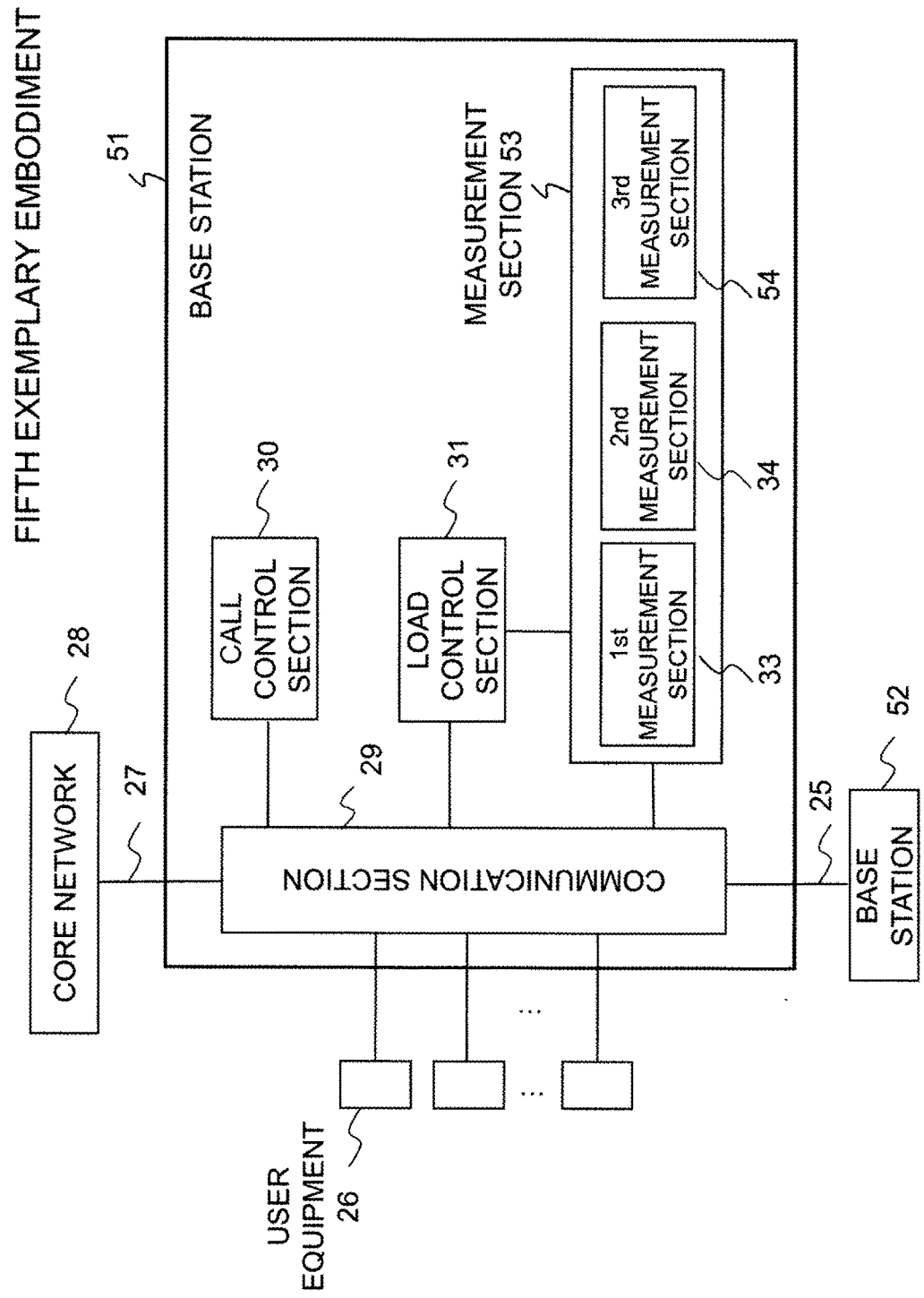
FIG. 14 is a block diagram showing a configuration of a base station according to a fifth exemplary embodiment of the present invention.

Comparing the present exemplary embodiment to the second exemplary embodiment, the configurations of base stations 51 and 52 included in the communication system are different. The base station 51 according to the present exemplary embodiment transmits/receives operation information on a cell to/from the base station 52. Moreover, the base station 51 controls the cell 23, while the base station 52 controls the cell 24. FIG. 14 shows the configuration of the base station 51 according to the present exemplary embodiment.

A measurement section 53 of the base station 51 shown in FIG. 14 includes a third measurement section 54, in addition to the first measurement section 33 and the second measurement section 34. The first measurement section 33 and the second measurement section 34 measure the load on the cell 23 and the number of active users in the cell 23, respectively, as in the second exemplary embodiment. The third measurement section 54 measures the probability distribution of user throughput in the cell 23. Specifically, the third measurement section 54, for each call of user terminal, measures the number of bytes transmitted over the downlink and uplink and retains them as user throughputs. Further, the third measurement section 54, for each cell, compiles such user throughputs during a predetermined time interval and creates a histogram or cumulative distribution function of user throughput. Then, the measurement section 53 notifies the probability distribution of user throughput measured by the third measurement section 54 to the load control section 31. Furthermore, the measurement section 53 includes the probability distribution of user throughput measured by the third measurement section 54 into operation information on the cell 23 and transmits it to the base station 52 through the inter-BS interface 25.

Next, FIG. 15 shows an example of operation information on the cell 23 transmitted by the base station 51 to the base station 52 in the present exemplary embodiment.

The operation information shown in FIG. 15 includes "Number of Calls per DL User Throughput", which is information on a probability distribution of downlink user throughput, in addition to the operation information shown in FIG. 8. In the present exemplary embodiment, downlink user throughputs are marked at 0.1 Mb/s, 0.2 Mb/s, 0.5 Mb/s, 1.0 Mb/s, 2.0 Mb/s, 5.0 Mb/s, 10 Mb/s, 20 Mb/s, and 50 Mb/s on a scale of a histogram, and the number of calls within a predetermined time interval is measured for each bin of the histogram and included in operation information. Uplink user throughputs are similarly measured and included in operation information.

Figure 16:
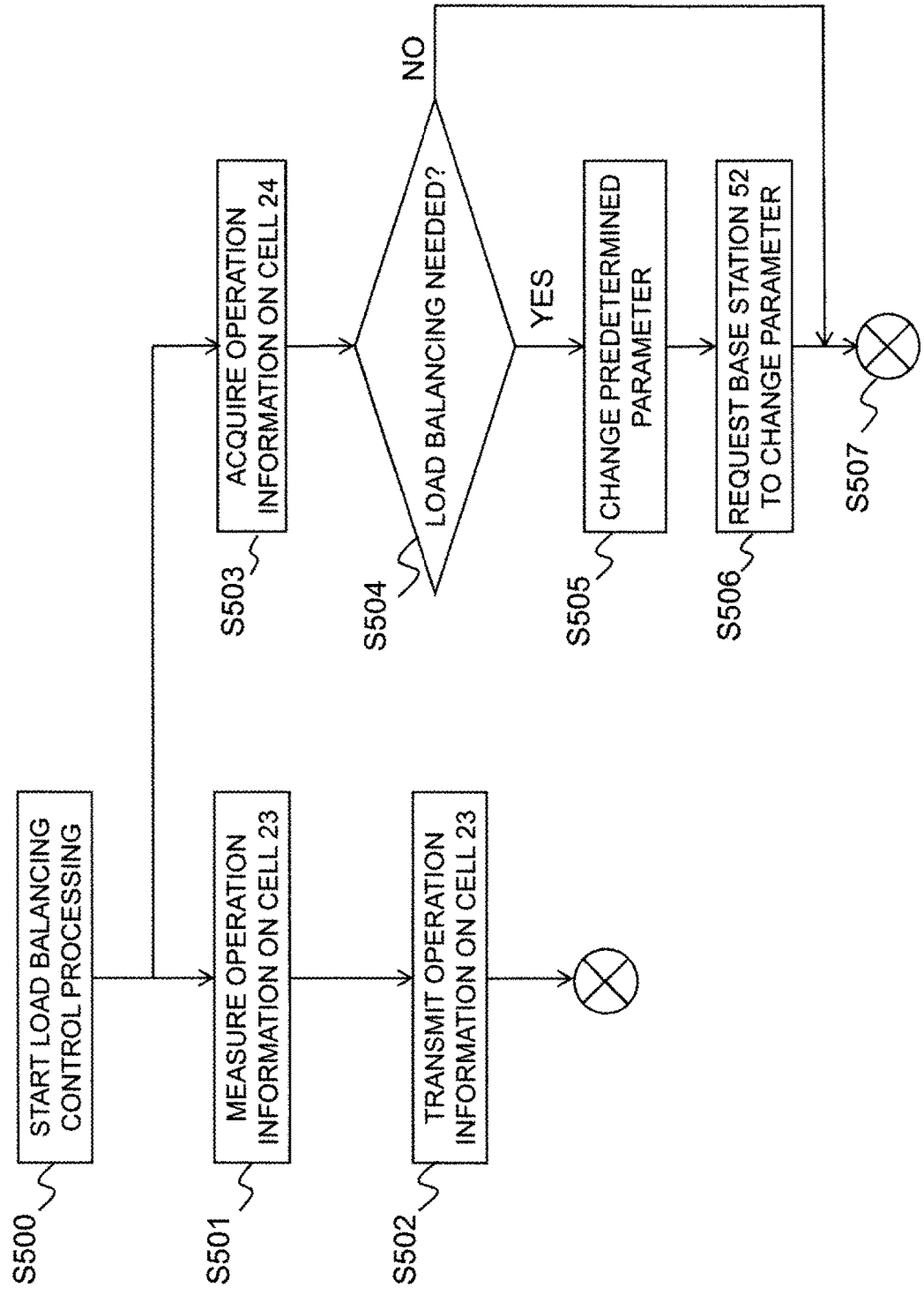
FIG. 16 is a flowchart for describing load control processing in the fifth exemplary embodiment of the present invention.

Next, FIG. 16 shows a flowchart of load balancing control processing according to the present exemplary embodiment.

First, a case will be described where the base station 51 transmits operation information to the base station 52. When the base station 51 in the present exemplary embodiment starts load balancing control processing (Operation S500), the measurement section 53 measures operation information on the cell 23 controlled by the base station 51 (Operation S501). Here, the operation information on the cell 23 in the present exemplary embodiment is the operation information shown in FIG. 15. That is, the measurement section 53 in the present exemplary embodiment measures at least the load on the cell 23, the number of active users in the cell 23, and the probability distribution of user throughput in the cell 23 and notifies them to the load control section 31.

Then, the measurement section 53 transmits the operation information on the cell 23 to the base station 52 through the inter-BS interface 25 (Operation S502).

Next, a case will be described where the base station 51 receives operation information on the cell 24 from the base station 52. In this case, the load control section 31 acquires the operation information on the cell 24 received by the base station 51 (Operation S503).

Subsequently, the load control section 31, based on the operation information on the cells 23 and 24, determines whether or not there is necessity for load balancing between the cells 23 and 24 (Operation S504). In this event, the load control section 31 determines the necessity for load balancing based on the loads on, the numbers of active users in, and the probability distributions of user throughput in the cells 23 and 24. For example, the load control section 31 may determine that there is necessity for load balancing both when the value of the following expression is larger than a fifth threshold: (load on the cell 23/number of active users in the cell 23)−(load on the cell 24/number of active users in the cell 24), and when the proportion of user throughputs in the cell 23 that are not greater than a predetermined value is larger than a sixth threshold while the proportion of user throughputs in the cell 24 that are not greater than a predetermined value is smaller than the sixth threshold.

When it is determined that load balancing is required (YES at Operation S504), the load control section 31 changes a predetermined parameter set on the base station 51 (Operation S505). The predetermined parameter is a load balancing-related parameter, which may be, for example, a parameter related to a criterion of handover and cell reselection from the cell 23 to the cell 24, or may be maximum transmission power and reference signal transmission power in the cell 23. Further, the load control section 31 requests the base station 52 to change a predetermined parameter (Operation S506). The predetermined parameter requested to be changed may be, for example, a parameter related to a criterion of handover and cell reselection from the cell 24 to the cell 23, or may be maximum transmission power and reference signal transmission power in the cell 24.

On the other hand, when the load control section 31 determines that load balancing is not required (NO at Operation S504), the processing is completed without changing the parameters (Operation S507).

As described above, according to the present exemplary embodiment, information on the probability distributions of user throughput in individual cells can be shared between base stations, in addition to the loads on and the numbers of active users in the individual cells. Accordingly, it is possible to efficiently perform load balancing particularly when user throughputs at the cell edge greatly degrade.

6. Sixth Exemplary Embodiment

Incidentally, when control for changing maximum transmission power is performed in a neighbor cell, the problem arises that the sufficient effects of load balancing cannot be achieved unless that change information is shared between base stations. For example, in the second exemplary embodiment, it is assumed that the base station 21 lowers maximum transmission power in the cell 23 to reduce interference from the cell 23 of the base station 21 to the cell 24 of the base station 22. Consequently, user terminal belonging to the cell 23 moves to the cell 24. On the other hand, it is assumed that the base station 22 changes a predetermined parameter in an attempt to perform load balancing between the cells 23 and 24, with the result that user terminal belonging to the cell 24 moves to the cell 23. Then, the effects of the control on maximum transmission power by the base station 21 and the effects of the control for parameter change by the base station 22 cancel out each other. This problem arises because a base station changes maximum transmission power or reference signal transmission power, but without notifying it to the other base station, each base station individually performs autonomous decentralized control.

Accordingly, in the present exemplary embodiment, a communication system will be described in which information on maximum transmission power or reference signal transmission power in each cell can be shared between base stations.

Figure 17:
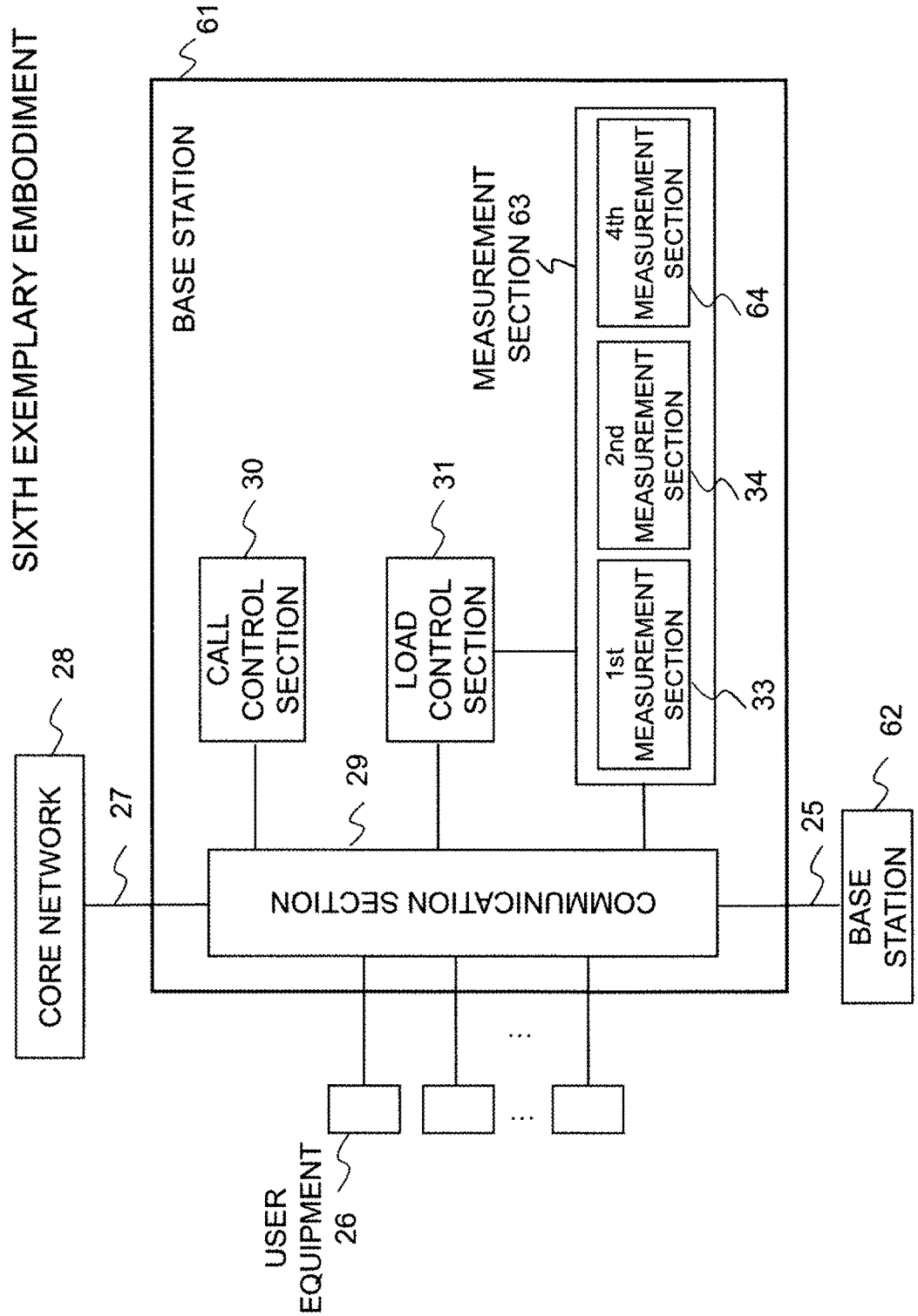
FIG. 17 is a block diagram showing a configuration of a base station according to a sixth exemplary embodiment of the present invention.

The communication system according to the present exemplary embodiment will be described. Comparing the present exemplary embodiment to the second exemplary embodiment, the configurations of base stations 61 and 62 included in the communication system are different. The base station 61 transmits/receives operation information on a cell to/from the base station 62. Moreover, the base station 61 controls the cell 23, while the base station 62 controls the cell 24. FIG. 17 shows the configuration of the base station 61 according to the present exemplary embodiment.

A measurement section 63 of the base station 61 shown in FIG. 17 includes a fourth measurement section 64, in addition to the first measurement section 33 and the second measurement section 34. The first measurement section 33 and the second measurement section 34 measure the load on the cell 23 and the number of active users in the cell 23, respectively, as in the second exemplary embodiment. The fourth measurement section 64 measures the maximum transmission power and a set value of the reference transmission power in the cell 23 and notifies them to the load control section 31. Moreover, the measurement section 63 sends the maximum transmission power and the set value of the reference signal transmission power measured by the fourth measurement section 64 to the base station 62 through the inter-BS interface 25.

Next, FIG. 18 shows an example of operation information on the cell 23 transmitted by the base station 61 to the base station 62 in the present exemplary embodiment.

The operation information shown in FIG. 18 includes downlink maximum transmission power (DL Maximum Transmission Power) 209 and downlink reference signal transmission power (DL Reference Signal Transmission Power) 210, in addition to the operation information shown in FIG. 8. Note that when the maximum transmission power in the downlink system bandwidth is changed, the reference signal transmission power, in general, is changed proportionally. Moreover, in some cases, the coverage of a cell is controlled by intentionally setting an offset to a reference signal. Accordingly, information on downlink maximum transmission power and information on downlink reference signal transmission power are acquired individually.

Figure 19:
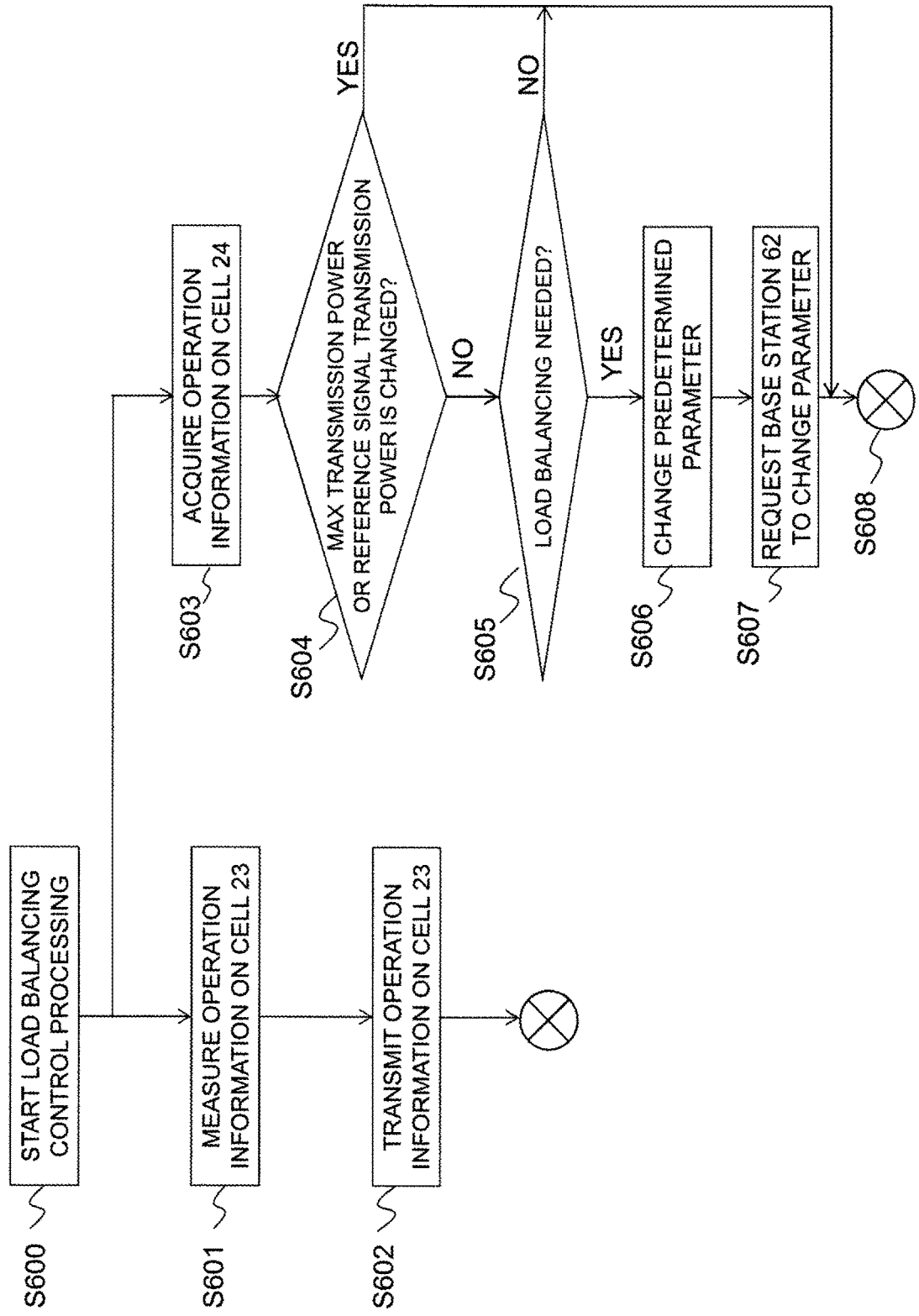
FIG. 19 is a flowchart for describing load control processing in the sixth exemplary embodiment of the present invention.

Next, FIG. 19 shows a flowchart of load balancing control processing according to the present exemplary embodiment.

First, a case will be described where the base station 61 transmits operation information to the base station 62. When the base station 61 in the present exemplary embodiment starts load balancing control processing (Operation S600), the measurement section 63 acquires operation information on the cell 23 controlled by the base station 61 (Operation S601).

Here, the operation information on the cell 23 in the present exemplary embodiment is the operation information shown in FIG. 18. That is, the measurement section 63 in the present exemplary embodiment measures at least the load on the cell 23, the number of active users in the cell 23, the maximum transmission power, and a set value of the reference signal transmission power in the cell 23, and notifies them to the load control section 31.

Then, the measurement section 63 transmits the operation information on the cell 23 to the base station 62 through the inter-BS interface 25 (Operation S602) and completes the processing.

Next, a case will be described where the base station 61 receives operation information on the cell 24 from the base station 62. In this case, the load control section 31 acquires the operation information on the cell 24 received by the base station 61 (Operation S603).

Subsequently, the load control section 31 determines whether or not the maximum transmission power and the set value of the reference signal transmission power in the cell 24 included in the received operation information have been changed from the values included in operation information previously received (Operation S604). That is, the load control section 31 determines whether or not control for changing the maximum transmission power and the set value of the reference signal transmission power in the cell 24 has been performed by the base station 62.

First, a case will be described where it is determined that the maximum transmission power and the set value of the reference signal transmission power in the cell 24 are not changed (NO at Operation S604). In this case, the load control section 31, based on the operation information on the cells 23 and 24, determines whether or not there is necessity for load balancing between the cells 23 and 24 (Operation S605). For example, the cells 23 and 24 are compared in load per active user in a cell, and when the difference therebetween is larger than a seventh threshold or when the difference therebetween is smaller than an eighth threshold, it may be determined that there is necessity for load balancing.

When the load control section 31 determines that load balancing is required (YES at Operation S605), a predetermined parameter of the cell 23 is changed for load balancing (Operation S606). The predetermined parameter is a load balancing-related parameter, which may be, for example, a parameter related to a criterion of handover and cell reselection from the cell 23 to the cell 24, or may be maximum transmission power and reference signal transmission power in the cell 23. For example, when the difference in load per active user in a cell is larger than the seventh threshold, it is determined that there is necessity for load balancing, and control for reducing the maximum transmission power and the reference signal transmission power in the cell 23 by a preset step may be performed. Moreover, when the difference in load per active user in a cell is smaller than the eighth threshold, control for increasing the maximum transmission power and the reference signal transmission power by a preset step may be performed.

Subsequently, the load control section 31 transmits a request to change a predetermined parameter to the base station 62 through the inter-BS interface 25 (Operation S607). The predetermined parameter may be, for example, a parameter related to a criterion of handover and cell reselection from the cell 23 to the cell 24, or may be maximum transmission power and reference signal transmission power in the cell 23.

On the other hand, when the load control section 31 determines that the maximum transmission power and the set value of the reference signal transmission power in the cell 24 are changed (YES at Operation S604), the load control section 31 completes the processing without changing the parameters (Operation S608).

Moreover, even when the load control section 31 determines that the maximum transmission power and the set value of the reference signal transmission power in the cell 24 are not changed (NO at Operation S604), but when the load control section 31 determines that there is no necessity for load balancing based on the loads on and the numbers of active users in the cells (NO at Operation S605), the load control section 31 completes the processing without changing the parameters (Operation S608).

As described above, in the present exemplary embodiment, base stations can share the values of maximum transmission power or reference signal transmission power in cells. That is, a base station in the present exemplary embodiment can grasp whether or not the value of maximum transmission power or reference signal transmission power in a cell of a neighbor base station has been changed. Thus, it is possible to prevent the effects of load balancing control performed by a base station and the effects of load balancing control performed by another base station from canceling out each other. Accordingly, in the communication system according to the present exemplary embodiment, it is possible to efficiently perform load balancing control and thus to make network autonomous optimization more efficient.

7. Modification Examples

Note that although a base station performs load balancing control in the communication systems according to the first to sixth exemplary embodiments, this is not a restriction. For example, a base station management device managing base stations (e.g., EMS or NMS) may perform load balancing control. In this case, a base station transmits operation information on a cell acquired from another base station to a base station management device. Moreover, the base station also transmits operation information on a cell controlled by itself to the base station management device. Then, the base station management device, based on the acquired operation information on the cells, performs control for load balancing between these cells.

Further, the communication systems according to the first to sixth exemplary embodiments can be applied to a SON system, which performs autonomous optimization of radio parameters in mobile communication.

Furthermore, the operations in the communication systems described in the first to sixth exemplary embodiments may be controlled by a CPU (Central Processing Unit) of a device included in the communication system shown in FIG. 2 or 5, or of another device communicable with this device. In this case, it is needless to say that the operations are accomplished in such a manner that a recording medium storing software program codes for implementing the functions in each embodiment is prepared and the CPU is caused to operate by a general computer reading the program codes stored in the recording medium.

Note that the recording medium providing the programs may be any one as long as it can store the above-described program, such as, for example, CD-ROM (Compact Disc Read Only Memory), DVD-R (Digital Versatile Disk Recordable), optical disk, magnetic disk, or nonvolatile memory card.

Moreover, in the first to sixth exemplary embodiments, the type of a base station is not limited. That is, a base station may be any of a macro base station configuring a macro cell, a pico base station configuring a pico cell, and a femto base station (HNB (Home Node B) or HeNB) configuring a femto cell.

8. Additional Statements

Part or all of the above-described exemplary embodiments also can be stated as in, but is not limited to, the following additional statements.

(Additional Statement 1)

A communication system comprising: a first base station controlling a first cell; and a second base station connected to the first base station through an inter-BS interface, wherein the first base station transmits operation information on the first cell to the second base station through the inter-BS interface, wherein the operation information on the first cell includes information about a load on the first cell and information about a number of active users in the first cell.

(Additional Statement 2)

The communication system according to additional statement 1, wherein the operation information on the first cell includes a load on a predetermined service in the first cell and a number of active users of the predetermined service.

(Additional Statement 3)

The communication system according to additional statement 1 or 2, wherein the operation information on the first cell includes, of the load on the first cell, a load arising from communication of users subscribing to a predetermined operator and, of the active users in the first cell, a number of users subscribing to the predetermined operator.

(Additional Statement 4)

The communication system according to any one of additional statements 1 to 3, wherein the operation information on the first cell includes a probability distribution of user throughput in the first cell.

(Additional Statement 5)

The communication system according to any one of additional statements 1 to 4, wherein the operation information on the first cell includes a value of maximum transmission power and a set value of reference signal transmission power in the first cell.

(Additional Statement 6)

The communication system according to any one of additional statements 1 to 5, wherein the second base station forms a second cell, and the first base station receives operation information on the second cell through the inter-BS interface and, based on the operation information on the first cell and the operation information on the second cell, performs control for load balancing between the first and second cells.

(Additional Statement 7)

A base station controlling a first cell, comprising: a communication section that transmits operation information on the base station to anther base station through an inter-BS interface, wherein the operation information on the first cell includes a load on the first cell and a number of active users in the first cell.

(Additional Statement 8)

The base station according to additional statement 7, wherein the operation information on the first cell includes a load on a predetermined service in the first cell and a number of active users of the predetermined service.

(Additional Statement 9)

The base station according to additional statement 7 or 8, wherein the operation information on the first cell includes, of the load on the first cell, a load arising from communication of users subscribing to a predetermined operator and, of the active users in the first cell, a number of users subscribing to the predetermined operator.

(Additional Statement 10)

The base station according to any one of additional statements 7 to 9, wherein the operation information on the first cell includes a probability distribution of user throughput in the first cell.

(Additional Statement 11)

The base station according to any one of additional statements 7 to 10, wherein the operation information on the first cell includes a value of maximum transmission power and a set value of reference signal transmission power in the first cell.

(Additional Statement 12)

The base station further comprising a load control section that performs control for load balancing between base stations, wherein the another base station forms a second cell, and the communication section receives operation information on the second cell, and the load control section, based on the operation information on the first cell and the operation information on the second cell, performs control for load balancing between the first and second cells.

(Additional Statement 13)

A communication method, comprising the step of transmitting operation information on a first cell controlled by a first base station to a second base station through an inter-BS interface, wherein the operation information on the first cell includes a load on the first cell and a number of active users in the first cell.

(Additional Statement 14)

The communication method according to additional statement 13, wherein the operation information on the first cell includes a load on a predetermined service in the first cell and a number of active users of the predetermined service.

(Additional Statement 15)

The communication method according to additional statement 13 or 14, wherein the operation information on the first cell includes, of the load on the first cell, a load arising from communication of users subscribing to a predetermined operator and, of the active users in the first cell, a number of users subscribing to the predetermined operator.

(Additional Statement 16)

The communication method according to any one of additional statements 13 to 15, wherein the operation information on the first cell includes a probability distribution of user throughput in the first cell.

(Additional Statement 17)

The communication method according to any one of additional statements 13 to 17, wherein the operation information on the first cell includes a value of maximum transmission power and a set value of reference signal transmission power in the first cell.

(Additional Statement 18)

The communication method according to any one of additional statements 13 to 17, wherein the second base station forms a second cell, the method comprising the steps of: by the first base station, receiving operation information on the second cell through the inter-BS interface; and, based on the operation information on the first cell and the operation information on the second cell, performing control for load balancing between the first and second cells.

(Additional Statement 19)

A program causing a computer to execute the step of transmitting operation information on a first cell controlled by a first base station to a second base station through an inter-BS interface, wherein the operation information on the first cell includes a load on the first cell and a number of active users in the first cell.

(Additional Statement 20)

The program according to additional statement 19, wherein the operation information on the first cell includes a load on a predetermined service in the first cell and a number of active users of the predetermined service.

(Additional Statement 21)

The program according to additional statement 19 or 20, wherein the operation information on the first cell includes, of the load on the first cell, a load arising from communication of users subscribing to a predetermined operator and, of the active users in the first cell, a number of users subscribing to the predetermined operator.

(Additional Statement 22)

The program according to any one of additional statements 19 to 21, wherein the operation information on the first cell includes a probability distribution of user throughput in the first cell.

(Additional Statement 23)

The program according to any one of additional statements 19 to 22, wherein the operation information on the first cell includes a value of maximum transmission power and a set value of reference signal transmission power in the first cell.

(Additional Statement 24)

The program according to any one of additional statements 19 to 23, wherein the second base station forms a second cell, the program causing the computer to execute the steps of: by the first base station, receiving operation information on the second cell through the inter-BS interface; and, based on the operation information on the first cell and the operation information on the second cell, performing control for load balancing between the first and second cells.

(Additional Statement 25)

A recording medium that is a computer-readable information recording medium, the recording medium recording the program according to any one of additional statements 19 to 24.

REFERENCE SIGNS LIST

10, 20 Communication system
11, 12, 21, 22, 51, 52, 61, 62 Base station
13, 23, 24 Cell
14, 25 Inter-BS interface
15, 29 Communication section
26 User terminal
27 Base station-core interface
28 Core network
30 Call control section
31 Load control section
32, 53, 63 Measurement section
33 First measurement section
34 Second measurement section
54 Third measurement section
64 Fourth measurement section

The invention claimed is:

1. A communication system comprising:
    a first base station controlling a first cell; and
    a second base station controlling a second cell, the second base station being connected to the first base station through an inter-base-station interface,
    wherein the first base station transmits first operation information on the first cell to the second base station through the inter-base-station interface, the first operation information on the first cell including information about a load on the first cell and information about a number of active users in the first cell, and
    wherein the second base station determines, based on the first operation information and the second operation information on the second cell, whether load balancing between the first and second cells is necessary.

2. The communication system according to claim 1, wherein the first operation information on the first cell includes information about a load on a predetermined service in the first cell and information about a number of active users of the predetermined service.

3. The communication system according to claim 1, wherein the first operation information on the first cell includes information about, of the load on the first cell, a load arising from communication of users subscribing to a predetermined operator, and information about, of the active users in the first cell, a number of users subscribing to the predetermined operator.

4. The communication system according to claim 1, wherein the first operation information on the first cell includes information about a probability distribution of user throughput in the first cell.

5. The communication system according to claim 1, wherein the first operation information on the first cell includes a value of maximum transmission power and a set value of reference signal transmission power in the first cell.

6. The communication system according to claim 1, wherein the first base station receives the second operation information on the second cell through the inter-base-station interface and, based on the first operation information on the first cell and the second operation information on the second cell, performs control to determine whether load balancing between the first cell and the second cell is necessary.

7. The communication system according to claim 2, wherein the first operation information on the first cell includes information about, of the load on the first cell, a load arising from communication of users subscribing to a predetermined operator, and information about, of the active users in the first cell, a number of users subscribing to the predetermined operator.

8. The communication system according to claim 2, wherein the first operation information on the first cell includes information about a probability distribution of user throughput in the first cell.

9. A base station controlling a first cell, the base station comprising:
    a communication section that is configured to receive operation information on a second cell from anther base station through an inter-base-station interface, the other base station controlling the second cell, the operation information on the second cell including information about a load on the second cell and information about a number of active users in the second cell; and
    a controller configured to determine, based on the operation information on the second cell and the operation information on the first cell, whether load balancing between the first and second cells is necessary.

10. The base station according to claim 9, wherein the operation information on the first cell includes information about a load on a predetermined service in the first cell and information about a number of active users of the predetermined service.

11. The base station according to claim 9, wherein the operation information on the first cell includes information about, of the load on the first cell, a load arising from communication of users subscribing to a predetermined operator, and information about, of the active users in the first cell, a number of users subscribing to the predetermined operator.

12. The base station according to claim 9, wherein the operation information on the first cell includes information about a probability distribution of user throughput in the first cell.

13. The base station according to claim 9, wherein the operation information on the first cell includes a value of maximum transmission power and a set value of reference signal transmission power in the first cell.

14. A communication method, comprising:
transmitting operation information on a first cell controlled by a first base station to a second base station through an inter-base-station interface, the operation information on the first cell including information about a load on the first cell and information about a number of active users in the first cell,
wherein the second base station determines, based on the operation information on the first cell and operation information on a second cell, whether load balancing between the first and second cells is necessary.

15. The communication method according to claim 14, wherein the operation information on the first cell includes information about a load on a predetermined service in the first cell and information about a number of active users of the predetermined service.

16. The communication method according to claim 14, wherein the operation information on the first cell includes information about, of the load on the first cell, a load arising from communication of users subscribing to a predetermined operator, and information about, of the active users in the first cell, a number of users subscribing to the predetermined operator.

17. The communication method according to claim 14, wherein the operation information on the first cell includes information about a probability distribution of user throughput in the first cell.

18. The communication method according to claim 14, wherein the operation information on the first cell includes a value of maximum transmission power and a set value of reference signal transmission power in the first cell.

19. A program for causing a computer to function as a first base station controlling a first cell, the program causing the computer to implement the function of:
receiving operation information on a second cell from a second base station through an inter-base-station interface, the second base station controlling the second cell, the operation information on the second cell including information about a load on the second cell and information about a number of active users in the second cell; and
determining, based on the operation information on the second cell and operation information on the first cell, whether load balancing between the first and second cells is necessary.

20. A non-transitory computer-readable information recording medium recording the program according to claim 19.

* * * * *